US012691745B2

(12) United States Patent
Boisgard et al.

(10) Patent No.: US 12,691,745 B2
(45) Date of Patent: Jul. 28, 2026

(54) MOTOR VEHICLE WITH REAR IMPACT FORCE RECOVERY BY A TRACTION BATTERY TRAY

(71) Applicant: STELLANTIS AUTO SAS, Poissy (FR)

(72) Inventors: Vincent Boisgard, St Cyr sur Loire (FR); Marc Peru, Chatenay Malabry (FR); Christophe Picquet, Versailles (FR); Richard Zeitouni, Bois D Arcy (FR); Sylvain Marcille, Bondoufle (FR)

(73) Assignee: Stellantis Auto SAS, Poissy (FR)

( * ) Notice: Subject to any disclaimer, the term of this patent is extended or adjusted under 35 U.S.C. 154(b) by 307 days.

(21) Appl. No.: 18/684,797

(22) PCT Filed: Sep. 2, 2022

(86) PCT No.: PCT/FR2022/051655
§ 371 (c)(1),
(2) Date: Feb. 19, 2024

(87) PCT Pub. No.: WO2023/052699
PCT Pub. Date: Apr. 6, 2023

(65) Prior Publication Data
US 2024/0351420 A1      Oct. 24, 2024

(30) Foreign Application Priority Data
Sep. 29, 2021     (FR) ...................................... 2110255

(51) Int. Cl.
*B60K 1/04*          (2019.01)

(52) U.S. Cl.
CPC ........ B60K 1/04 (2013.01); *B60K 2001/0438* (2013.01)

(58) Field of Classification Search
CPC .......................... B60K 1/04; B60K 2001/0438
See application file for complete search history.

(56) References Cited

U.S. PATENT DOCUMENTS

2024/0083515 A1* 3/2024 Peru ................... B62D 25/2018
2024/0351420 A1* 10/2024 Boisgard ................. B60K 1/04

FOREIGN PATENT DOCUMENTS

FR      3100214 A1 *  3/2021   ......... B62D 25/2018
FR      3103450 A1     5/2021
FR      3141888 A1 *  5/2024   ............ B62D 25/08

(Continued)

OTHER PUBLICATIONS

International Search Report for PCT/FR2022/051655 mailed Jan. 4, 2023.
Written Opinion for PCT/FR2022/051655 mailed Jan. 4, 2023.

*Primary Examiner* — Jacob B Meyer
(74) *Attorney, Agent, or Firm* — Sandberg Phoenix & von Gontard, PC

(57) ABSTRACT
The present invention relates to a motor vehicle comprising a structure (8) with a floor, a tray (2) for electrical traction energy accumulators, which tray is arranged under the floor and comprises two side profile members (6), and a rear drive unit (4) arranged at the rear of the tray (2) and attached to the structure by attachment means (10). The motor vehicle is characterized in that the attachment means are additionally attached to each of the two side profile members via a connecting piece (20, 30, 40), respectively.

10 Claims, 3 Drawing Sheets

(56)         References Cited

FOREIGN PATENT DOCUMENTS

| FR | 3158694 | A1 | * | 8/2025 | ............. B62D 25/08 |
| WO | WO-2021038157 | A1 | * | 3/2021 | ........... B62D 21/152 |
| WO | 2021122131 | A1 |   | 6/2021 | |
| WO | WO-2025074045 | A1 | * | 4/2025 | ............... B60K 1/04 |

* cited by examiner

[Fig. 1]
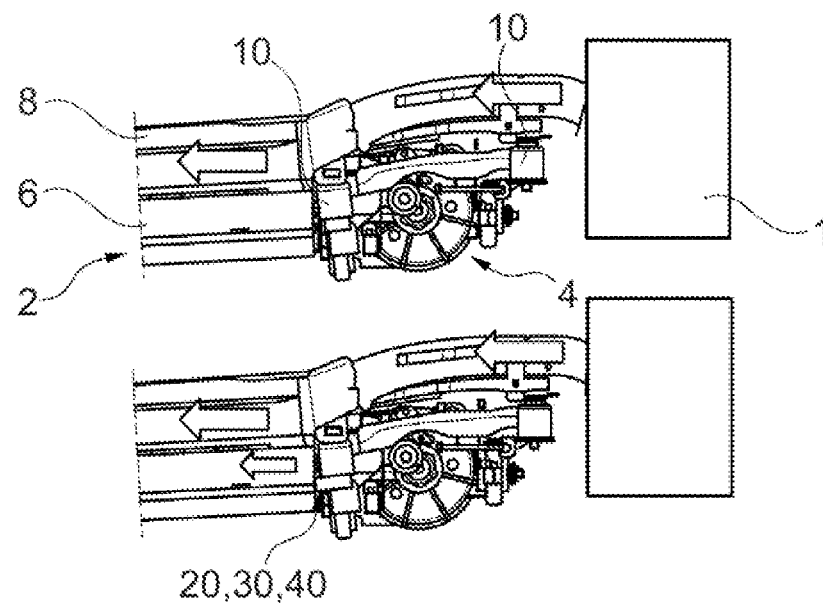
[Fig. 2]
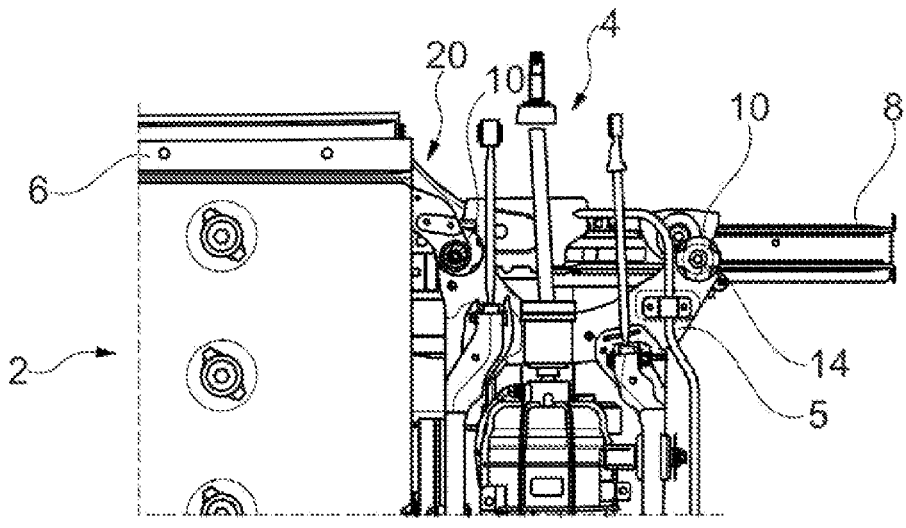

[Fig. 3]
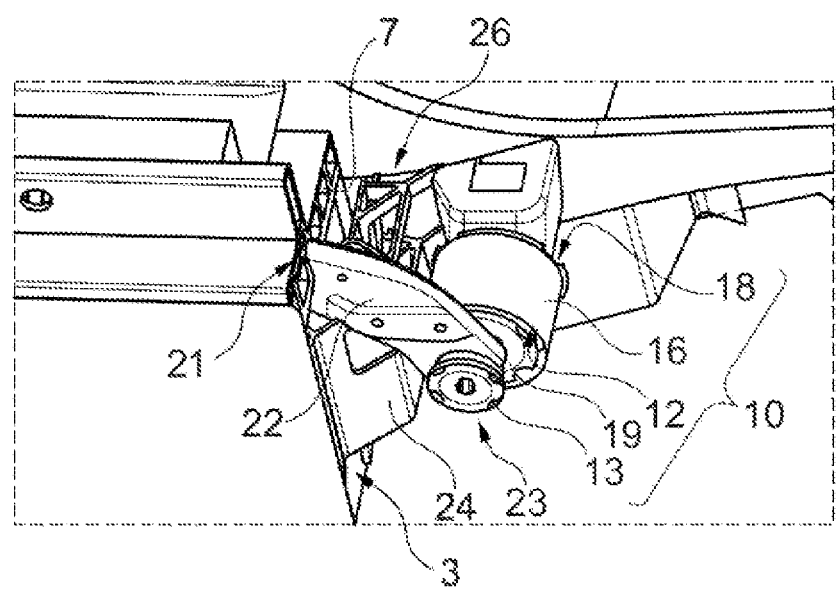
[Fig. 4]
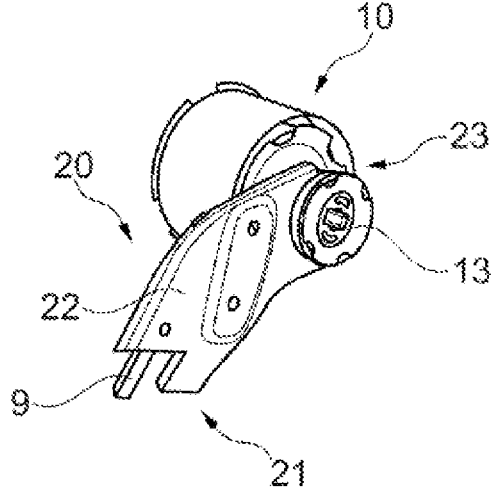

[Fig. 5]
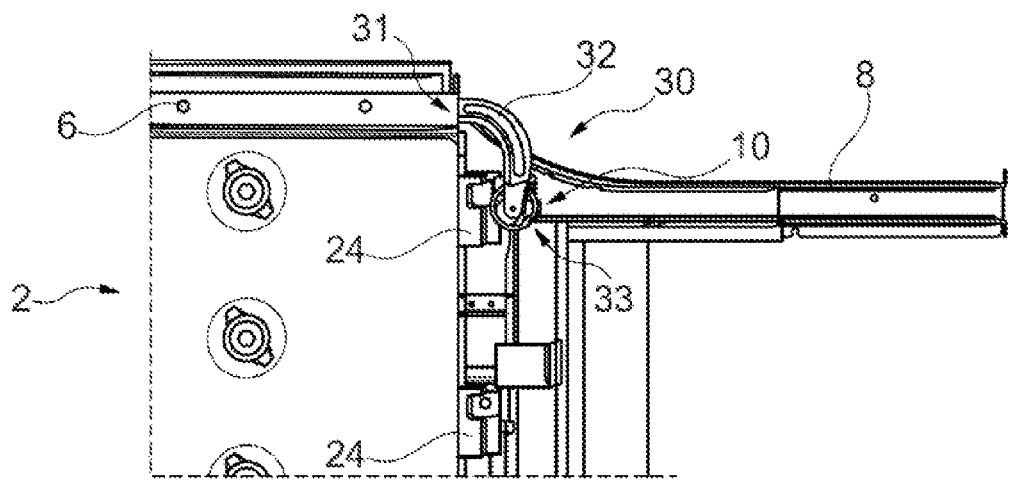
[Fig. 6]
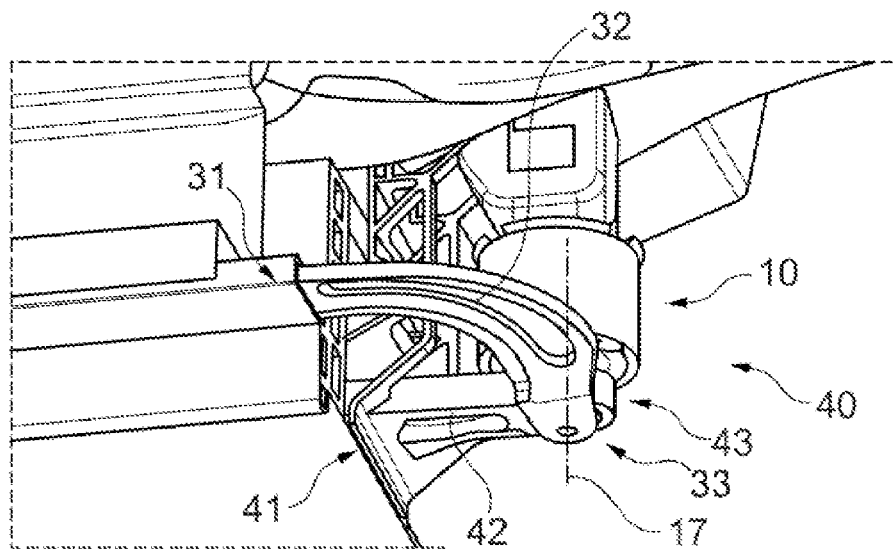

1

MOTOR VEHICLE WITH REAR IMPACT FORCE RECOVERY BY A TRACTION BATTERY TRAY

CROSS-REFERENCE TO RELATED APPLICATIONS

This application is the US National Stage under 35 USC § 371 of International Application No. PCT/FR2022/051655, filed Sep. 2, 2022, which claims the priority of French application 2110255 filed on Sep. 29, 2021, the content (text, drawings and claims) of both said applications being incorporated by reference herein.

BACKGROUND

The present description relates to the field of motor vehicles, more particularly to the field of motor vehicle structure.

The ability of a motor vehicle to ensure the safety of its occupants in the event of a collision is evaluated by collision tests according to various protocols determined by various organizations, such as, in particular, the NHTSA, which stands for the "National Highway Traffic Safety Administration", the American federal agency responsible for road safety.

Among the various collision protocols is the rear impact protocol using a 1368 kg deformable barrier moving at 80 km/h towards the rear of a stopped motor vehicle, with a 70% overlap, as well as the rear impact protocol using a 1800 kg rigid barrier moving at 51 km/h toward the rear of a stopped motor vehicle, with a 100% overlap. The first protocol is particularly restrictive due to the large intrusion resulting from the partial overlap. The second protocol is also particularly restrictive from a point of view of the accelerations generated, due to the rigidity and the mass of the barrier.

Satisfying these collision protocols, in particular on electric traction vehicles equipped with particularly heavy traction batteries, requires reinforcing the vehicle structure; this may lead to excessive weight and manufacturing costs, which are generally undesirable.

Published patent document FR 3 103450 A1 proposes an electric traction motor vehicle structure capable of protecting the traction batteries in the event of rear collision. To this end, the tray for receiving the traction batteries comprises two side profile members and a rear transverse profile attached to the rear ends of the side profile members. In the event of a rear collision, the axle of the rear drive unit moves forward and comes into abutment against the rear transverse profile. The fasteners of the rear transverse profile at the rear ends of the side profile members are beak-shaped so as to control the deformation of the profiles. This solution essentially aims to protect the traction batteries.

SUMMARY

The purpose is to overcome at least one of the disadvantages of the aforementioned prior art. More particularly, the aim is to improve the behavior of an electric traction motor vehicle to the rear collision protocols, and to do so economically and without adding significant weight.

To this end, the devices described herein relate to a motor vehicle comprising:

a structure with a floor;

2 a tray for electrical traction energy accumulators, arranged under the floor and comprising two side profile members;

a rear drive unit arranged at the rear of the tray and attached to the structure by attachment means;

characterized in that the attachment means are further fastened to each of the two side profile members via a connecting piece, respectively.

Advantageously, the connecting piece provides a direct connection between the attachment means and the side profile members.

According to one embodiment, the attachment means comprise at each lateral side of the motor vehicle:

a core attached to the structure;

a ring surrounding the core and connected to the rear drive unit;

an elastomer connecting the core and the ring;

each of the connecting pieces being attached to one of the cores. These attachment means are advantageously silent blocks, more advantageously two silent blocks.

According to one embodiment, each core comprises a vertical tube portion through which a screw passes, with an upper face against the structure and a lower face against the corresponding connecting piece through which said screw passes.

According to one embodiment, each of the connecting pieces comprises a tab with a front end attached to the corresponding side profile member and a rear end attached to the attachment means.

According to one embodiment, each of the two tabs is bent 90°.

According to one embodiment, each of the two side profile members has a cross-section forming at least one cavity, the front end of each of the two tabs being embedded in the at least one cavity.

According to one embodiment, the motor vehicle comprises, at each lateral side of the motor vehicle, a piece for attaching the tray to the structure, respectively, each of said attachment pieces being adjacent to the corresponding side profile member and having an upper face attached to said structure.

According to one embodiment, each of the connecting pieces comprises a complementary tab with a front end rigidly connected to the attachment piece and a rear end joining the rear end of the corresponding tab.

According to one embodiment, the rear drive unit comprises a cradle comprising the attachment means.

According to one embodiment, each of the side profile members is an extruded rectilinear profile with a cross-section forming a plurality of closed cavities.

BRIEF DESCRIPTION OF THE DRAWINGS

FIG. 1 is a side view of a vehicle structure during a rear impact protocol.

FIG. 2 shows a view from below of a vehicle according to a first embodiment thereof.

FIG. 3 shows a perspective view of the connecting piece according to the first embodiment thereof.

FIG. 4 is a perspective view of the connecting piece according to the first embodiment thereof.

FIG. 5 shows a partial view from below of a vehicle according to a second embodiment thereof.

FIG. 6 is a perspective view of the connecting piece according to the third embodiment thereof.

DETAILED DESCRIPTION

The upper part of FIG. 1 is a side view of a conventional vehicle during a rear impact protocol. The vehicle comprises a structure 8 with a floor, a tray 2 for electrical traction energy accumulators, commonly called a battery tray, arranged under the floor and comprising two side profile members 6, and a rear drive unit 4 arranged behind the tray 2 and attached to the structure 8 by attachment means 10. The vehicle undergoes the rear impact force (shown by arrows) caused by a rear impact barrier 1 mainly at the structure 8 and the rear drive unit 4, and does so without passing through the tray 2.

Furthermore, the lower part of FIG. 1 is a side view of a vehicle during a rear impact protocol, comprising a connecting piece 20, 30, 40, in this case according to three embodiments which will be described below, between the rear drive unit 4 and each of the two side profile members 6 of the tray 2.

Each of the two mechanical connections 20, 30, or 40 is made, to the rear drive unit 4, with the means 10 for attaching said rear drive unit 4 to the structure 8, so as to allow transmission of the rear impact force towards the side profile members 6 by first passing through the structure 8, the rear drive unit 4, then through the attachment means 10 and the profiles 6 of the tray 2. The lower-left arrow shows the absorption of the force by the profiles 6 of the tray 2. The two side profile members 6 belonging to the tray 2 are in principle sized broadly to allow them to withstand a collision test following a lateral impact protocol against a vertical post and can thus substantially participate in the absorption of rear collision energy and force.

Advantageously, the connecting piece 20, 30, 40 provides a direct connection between the attachment means 10 and the side profile members 6.

FIGS. 2 and 3 show a first embodiment, the mechanical connection between the attachment means 10 and the side profile members 6 is a direct connection provided by the connecting piece 20. The rear drive unit 4 comprises a cradle 5 attached to the structure 8 by the attachment means 10.

Preferentially, the cradle 5 of the rear drive unit 4 has rings 14 linked to the attachment means 10.

Referring to FIG. 3, each of the attachment means 10 comprises at each lateral side of the motor vehicle:
    a core 12 attached to the structure and comprising a tip 13;
    an elastomer 16 of the silent-block type connecting the core 12 and the ring 14; each of the connecting pieces 20 being attached to one of the cores 12.

Advantageously, each core 12 comprises a vertical tube portion through which a screw passes, with an upper face 18 against the structure 8 and a lower face 19 against the corresponding connecting piece 20 through which said screw passes.

Referring to FIG. 3, the connecting piece 20 comprises a tab 22 with a front end 21 attached to the corresponding side profile member and a rear end 23 attached to the attachment means 10.

Preferentially, the tip 13 belonging to the core 12 has a cylindrical exterior surface in contact with the rear end 23 belonging to the tab 22 allowing it to ensure the direct and rigid connection between the structure 8 and the corresponding connecting piece 20.

Each of the side profile members 6 is preferably an extruded rectilinear profile, furthermore preferably manufactured from an alloy of light metals, in particular an aluminum alloy. Preferably, the side profile members 6 are multi-chamber hollow profiles comprising at least one cavity 7.

The attachment of the tray 2 onto the structure 8 is ensured by at least one attachment piece 24 arranged at each lateral side of the motor vehicle and adjacent to the corresponding side profile member 6, said attachment piece 24 comprises an upper face 26 attached to said structure 8 preferentially by means of a screw. The tray 2 comprises a rear face 3, the attachment piece 24 is in direct contact with said rear face 3.

The tab 22 can be a component under pressure, a stamped part, a forged part, or a welded part, and is also preferably manufactured from a light and rigid alloy of metals, in particular an aluminum alloy.

The attachment of the tab 22 with the side profile member 6 can be formed by welding, for example by one or more welding beads and/or by welding points.

The tab 22 can be part of the attachment piece 24, thus forming a single piece. To this end, said part formed by the tab 22 and the attachment piece 24 may be a molded part and is further preferably manufactured from a light and rigid alloy of metals, in particular an aluminum alloy.

FIG. 4 shows a perspective view of the connecting piece 20 comprising the tab 22 having the front end 21 which can be intended to fit into the at least one cavity of the side profile member of the battery tray.

Preferentially, the fitting of the tab 22 is ensured by means of a pin 9 belonging to the side profile member 6, preferably, said pin 9 is positioned inside the cavity belonging to the side profile member and is intended to be fitted by being wedged into a cavity belonging to the front end 21 of the tab 22.

In parallel with the fitting of the tab 22 into the side profile member 6, the front end 21 of the tab 22 can be fastened with the tray, said attachment may be formed by welding. Following this logic, the welds can be made directly on the rear face of the tray.

Preferentially, the tip 13 belonging to the core of one of the attachment means 10 has a cylindrical exterior surface in contact with the rear end 23 belonging to the tab 22 allowing it to ensure the direct and rigid connection between the structure 8 and the corresponding connecting piece 20.

FIG. 5 shows a second embodiment which comprises providing a direct connection between the attachment means 10 and the side profile member 6 by means of a connecting piece 30.

Preferably, each of the attachment means 10 comprises, at each lateral side of the motor vehicle, the core attached to the structure 8, the elastomer of the silent block type connecting the core and the ring, each of the connecting pieces 30 being attached to one of the cores.

Advantageously, each core comprises a vertical tube portion through which a screw passes, with an upper face against the structure and a lower face against the corresponding connecting piece 30 through which said screw passes.

Preferably, the connecting piece 30 comprises a tab 32 bent 90° and having a front end 31 attached to the corresponding side profile member 6 and a rear end 33 attached to the attachment means 10.

Preferentially, the cylindrical exterior surface of the tip belonging to the core connected to the structure 8 is in contact with the rear end 33 of the tab 32 allowing it to ensure the direct, rigid connection between the structure 8 and the corresponding connecting piece 30.

The front end 31 of the connecting piece 30 can be intended to fit into at least one cavity of the side profile member 6 of the tray 2.

The tab 32 can be a component under pressure, a stamped part or a forged part, and is further preferably manufactured from a lightweight, rigid alloy of metals, in particular an aluminum alloy.

The attachment of the tab 32 with the side profile member 6 is preferably formed by fitting the front end 31 into the at least one cavity, said fitting can be obtained by wedging the front end 31 in the at least one cavity.

FIG. 6 shows a third embodiment which comprises providing a connection between the attachment means 10 and the side profile member by means of a connecting piece 40.

Preferably, each of the attachment means 10 comprises, at each lateral side of the motor vehicle, the core attached to the structure, the elastomer of the silent block type connecting the core and the ring, each of the connecting pieces 40 being attached to one of the cores.

Advantageously, each core comprises a vertical tube portion through which a screw passes, with an upper face against the structure and a lower face against the corresponding connecting piece 40 through which said screw passes.

Preferably, the connecting piece 40 comprises the tab 32 bent 90° and having its front end 31 attached to the corresponding side profile member and its rear end 33 attached to the attachment means 10.

The tray is attached to the structure by the at least one attachment piece adjacent to the corresponding side profile member, the upper face belonging to said attachment piece is attached to said structure preferentially by means of a screw. The attachment piece is in direct contact with the rear face of the tray.

In parallel with the tab 32, the connecting piece 40 also comprises a complementary tab 42 with a front end 41 rigidly connected to the attachment piece and a rear end 43 joining the rear end 33 of the corresponding tab 32.

The tab 32 belonging to the connecting piece 40 can be a component under pressure, a stamped part or a forged part, and is further preferably manufactured from a lightweight, rigid alloy of metals, in particular an aluminum alloy.

The attachment of the tab 32 with the side profile member 6 is preferably formed by fitting the front end 31 into the at least one cavity, said fitting can be obtained by wedging the front end 31 in the at least one cavity.

Preferably, the complementary tab 42 is part of the attachment piece, thus forming a single piece. To this end, said part formed by the complementary tab 42 and the attachment piece may be a molded part and is further preferably manufactured from a light and rigid alloy of metals, in particular an aluminum alloy.

The front end 41 of the complementary tab 42 can be directly attached to the attachment tab, said attachment may be formed by one or more beads and/or by welding points. To that end, the complementary tab 42 can be a component under pressure, a stamped part or a forged part, and is further preferably manufactured from a lightweight, solid alloy of metals, in particular an aluminum alloy.

Preferably, the cylindrical exterior surface of the tip belonging to the core connected to the structure is in contact with the rear end 43 belonging to the complementary tab 42 allowing it to ensure the rigid connection between the structure and the corresponding connecting piece 40, said rear end 43 joins the rear end 33 of the tab 32.

Preferentially, the rear end 43 and the rear end 33 comprise an articulation pin 17 common to both rear ends 43, 33. In this respect, said rear end 33 is fork-shaped, said fork belonging to the tab 32 is configured to be in direct contact with the lower face of one of the attachment means 10. Advantageously, the articulation 17 between the tab 32 and the complementary tab 42 allows better transmission of force in the event of a rear impact towards one of the two side profile members 6 by avoiding transverse breakage of the tab 32.

The installation of the connecting piece 20, 30, 40 in a motor vehicle comprising a traction battery further enables the transmission of the rear impact force caused by the rear impact barrier toward the side profile members by first passing through the structure, the rear drive unit, then through the attachment means 10 and the profile of the battery tray. Advantageously, this makes it possible to save mass in the vehicle structure.

Advantageously, the described devices allow a significant mass saving on the structure of all motor vehicles equipped with a connecting piece 20, 30, 40 and at the same time, the behavior of said vehicles during rear impact protocols will be significantly improved by the fact of the use of the side profile members belonging to the traction battery tray as means for absorbing forces.

The invention claimed is:

1. A motor vehicle comprising:
a structure with a floor;
a tray for electrical traction energy accumulators, arranged under the floor and comprising two side profile members;
a rear drive unit arranged at the rear of the tray and attached to the structure by attachment means;
wherein the attachment means are further attached to each of the two side profile members via a connecting piece, respectively,
wherein the rear drive unit comprises a cradle comprising the attachment means.

2. A motor vehicle comprising:
a structure with a floor;
a tray for electrical traction energy accumulators, arranged under the floor and comprising two side profile members;
a rear drive unit arranged at the rear of the tray and attached to the structure by attachment means;
wherein the attachment means are further attached to each of the two side profile members via a connecting piece, respectively; and,
wherein the attachment means comprise at each lateral side of the motor vehicle:
a core attached to the structure;
a ring surrounding the core and connected to the rear drive unit;
an elastomer connecting the core and the ring;
each of the connecting pieces being attached to one of the cores.

3. The motor vehicle according to claim 2, wherein each core comprises a vertical tube portion through which a screw passes, with an upper face against the structure and a lower face against the corresponding connecting piece through which said screw passes.

4. The motor vehicle according to claim 1, wherein each of the connecting pieces comprises a tab with a front end attached to the corresponding side profile member and a rear end attached to the attachment means.

5. The motor vehicle according to claim 4, wherein each of the two tabs is bent 90°.

6. The motor vehicle according to claim 4, wherein each of the two side profile members has a cross-section forming at least one cavity, the front end of each of the two tabs being fitted into the at least one cavity.

7. The motor vehicle according to claim 1, comprising, at each lateral side of the motor vehicle, a piece for attaching the tray to the structure, respectively, each of said attachment pieces being adjacent to the corresponding side profile member and having an upper face attached to said structure.

8. The motor vehicle according to claim 7, wherein each of the connecting pieces comprises a complementary tab with a front end rigidly connected to the attachment piece and a rear end joining the rear end of the corresponding tab.

9. The motor vehicle according to claim 1, wherein each of the side profile members is an extruded rectilinear profile with a cross-section forming a plurality of cavities.

10. A motor vehicle comprising:

a structure with a floor;

a tray for electrical traction energy accumulators, arranged under the floor and comprising two side profile members;

a rear drive unit arranged at the rear of the tray and attached to the structure by attachment means;

wherein the attachment means are further attached to each of the two side profile members via a connecting piece, respectively.

* * * * *